April 27, 1937.   F. A. KUHN   2,078,858
TELESCOPE SIGHT
Filed Feb. 8, 1935
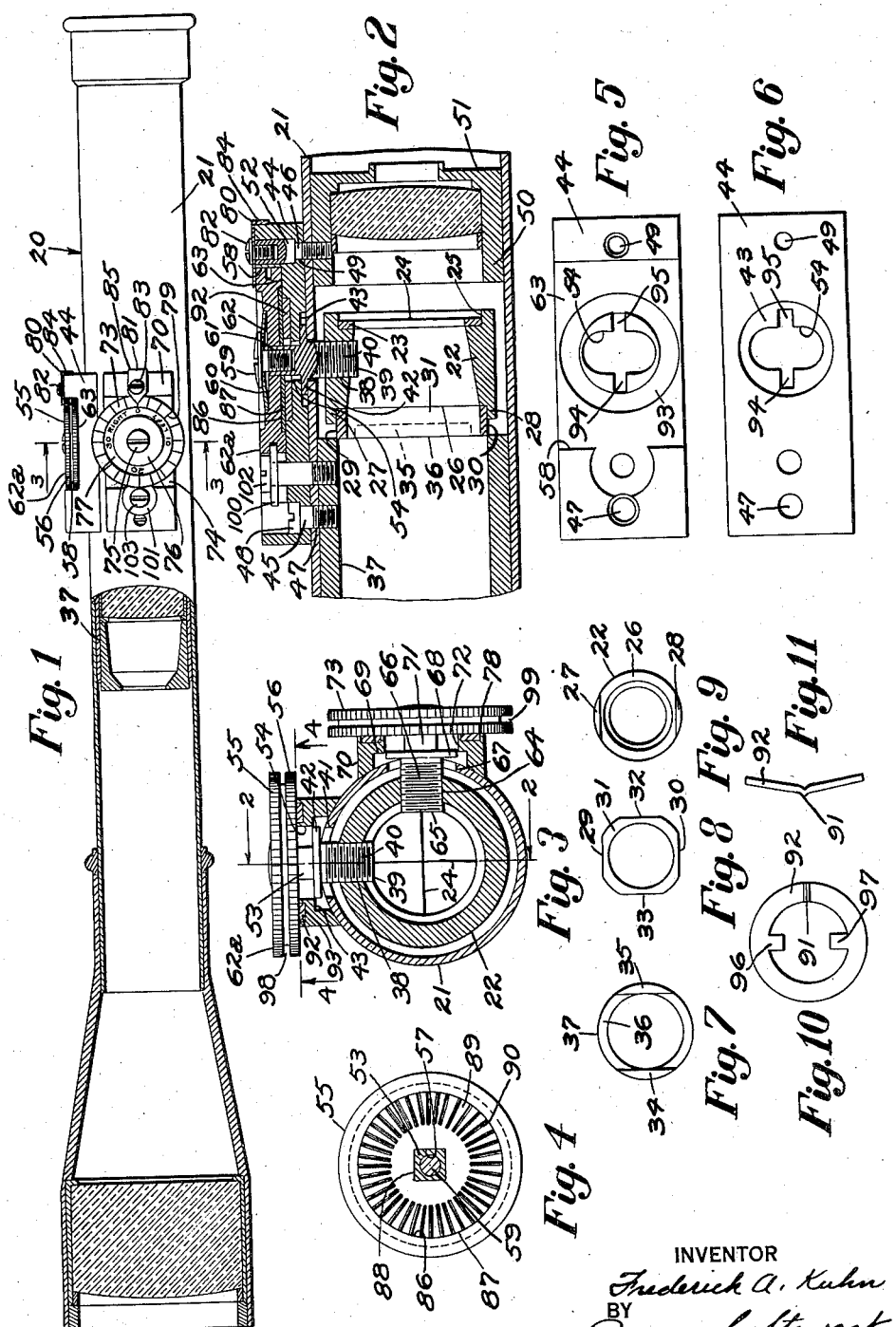
INVENTOR
Frederick A. Kuhn
BY
James S. Stewart
ATTORNEY Patented Apr. 27, 1937

2,078,858

UNITED STATES PATENT OFFICE 2,078,858

TELESCOPE SIGHT

Frederick Albert Kuhn, Meriden, Conn., assignor to The Lyman Gun Sight Corporation, Middlefield, Conn., a corporation of Connecticut Application February 8, 1935, Serial No. 5,567

13 Claims. (Cl. 33—50)

My invention relates to a telescope sight for a rifle or other firearm and more especially to a telescope sight suitable for use on high power hunting rifles.

A telescope sight, in order to be effective, must be so mounted, on the firearm with which it used, as to be capable of adjustment to bring the point of impact into coincidence with the point of aim at the desired range. In the case of telescope sights intended primarily for shooting at paper targets these adjustments are effected by the mounts or supports by means of which the telescope sights are secured on the firearm. In the case of telescope sights for hunting rifles the adjustments are effected sometimes by the mounts, or other supports in which the telescope is received, and sometimes by internal adjustment of the reticule or sighting part of the telescope, the latter being rigid with respect to the rifle. In order that the shock, due to the recoil of the rifle or other firearm on which the telescope is mounted, may not disturb the sighting adjustment, it is customary to mount target telescope sights so as to be slidable in their mounts, that is to say, the usual taget telescope sight is free to slide in a direction coinciding with its axis, the inertia of the telescope keeping the same comparatively still while the rifle on which it is mounted moves backwardly due to the recoil. Before firing the next shot the rifleman pulls the telescope back into its normal position.

It is not convenient to mount hunting telescope sights so as to be slidable in their mounts, chiefly for the reason that whereas a target shooter has plenty of time to move the telescope sight back into its normal position, after each shot, and to check the position of the same, the hunter is generally required to use his rifle in the field with little if any opportunity for inspection and correction, in fact hunting conditions are generally such that hours or even days may be spent trailing game which, when finally overtaken, must be brought down in a matter of perhaps a few seconds or the opportunity lost. As a result hunting telescope sights are adjusted and set for some particular distance and thereafter, when attached to a rifle, are intended to remain in fixed position and to require no adjustments.

I have found that in such cases, as where the mount, for a hunting telescope sight, is made adjustable, for elevation or windage or both, the inertia of the telescope is great enough, during the firing of the rifle, to disturb these adjustments and that mounts made heavy enough to be any degree effective against this inertia add excessive weight to the rifle. One of the principal objects of the present invention is to provide a telescope sight of the hunting type in which adjustments for elevation or windage, in the telescope mount, are eliminated so that the mount may be of relatively light weight and may absorb the recoil energy imparted to the telescope sight without any danger of a change in adjustment.

In a more specific aspect it is an object of the invention to bring about a form of telescope sight in which corrections for elevation and windage are taken care of in the telescope itself. This I prefer to do by making the reticule of the telescope adjustable vertically and horizontally. Thus the mechanism provided for sight adjustment is not called on to absorb the energy imparted to the telescope as a whole, during the recoil of the rifle or other firearm, and the chance of change in adjustment is eliminated.

Another object of the invention is to bring about a form of mechanism for adjusting the reticule, vertically and horizontally, by means of which positive movements of adjustment are possible and in which the reticule after adjustment is held rigidly against accidental change.

A feature of the invention resides in a form of reticule adjusting mechanism which is relatively compact and which is carried in and closely adjacent the tube of the telescope so that injury, or accidental change in sight setting, due to contact with external objects, during the use of the rifle or other firearm on which the telescope is mounted, are largely eliminated.

To these and other ends, the invention consists in the novel features and combination of parts to be hereinafter described and claimed.

In the drawing,

Fig. 1 is a side elevational view partly in section of a telescope sight, according to the invention;

Fig. 2 is a sectional view along line 2—2 of Fig. 3;

Fig. 3 is a sectional view along line 3—3 of Fig. 1;

Fig. 4 is a view taken in the direction 4—4 of Fig. 3;

Fig. 5 is a plan view of a part of the improved structure;

Fig. 6 is a view of the underside of the part shown in Fig. 5;

Figs. 7, 8, and 9 are end views of parts of the improved structure as will appear hereinafter, and Figs. 10 and 11 are plan and end views respectively of a part of the improved structure, Figs. 2-6 inclusive and Figs. 10 and 11 being on enlarged scales as compared to Figs. 1 and 7-9 inclusive.

Referring now to the drawing, in which I have illustrated my invention by showing a preferred embodiment of the same, the reference character 20 indicates, in general, the improved telescope sight which, in this instance, includes a barrel or tube 21, containing the optical system of the telescope, which forms no part of the present invention and will not be described herein in detail, except as may become necessary to a proper understanding of the invention.

Mounted within the tube 21, is a reticule holder 22, having at one end, in this instance the forward end, a reticule ring 23, to which cross hairs 24 are attached, in any usual or suitable manner the holder 22 being in the form of a hollow cylinder and counterbored at 25, to receive ring 23. The rear end of the holder 22 is slotted transversely at 26, to form arms 27 and 28, between which the faces 29 and 30, of guide 31, are received in a sliding fit, the faces 32 and 33, of guide 31, being at right angles to faces 29 and 30 and received in a sliding fit between the arms 34 and 35, formed by the vertical slot 36, in the forward end of a thickened part of the telescope tube, in this instance formed by the relatively heavy lens supporting tube 37.

The guide 31 is shown particularly in Fig. 8, the latter being an end view, the guide being generally in the form of a cylinder and having its peripheral surface flattened at 29, 30, 32, and 33, to form the guiding faces. Face 29 is parallel to face 30, while face 32 is parallel to face 33, faces 29 and 30 being at right angles to faces 32 and 33. Fig. 7 is an end view of the lens tube 37, taken from the forward end of the tube or, as viewed in Fig. 2, the right hand end. The slot 36 in the forward end of the tube 37 is of rectangular cross-sectional shape. Fig. 9 is an end view of the rear end of the reticule holder 22 or, as viewed in Fig. 2, this view is taken from the left hand end of the holder. The slot 26 in the rear end of the reticule holder 22 is likewise of rectangular cross-sectional shape.

The guide 31, as shown in Fig. 2, is mounted between the tube 37 and the reticule holder 22, in slots 26 and 36, and controls the movement of the reticule holder 22, restricting the latter to either a vertical or a horizontal direction. During the vertical movement the guide 31 slides in the vertical slot 36, in tube 37, while during the horizontal movement the holder moves horizontally with respect to the guide, the arms 27 and 28, of holder 22, sliding on faces 29 and 30, of guide 31. The wires of the cross hair 24 are at right angles to the faces 29, 30, 32, and 33, that is to say, the vertical wire of the cross hair is at right angles to faces 29 and 30, and parallel to faces 32 and 33, while the horizontal wire is at right angles to faces 32 and 33, and parallel to faces 29 and 30. Thus the movement of the reticule holder is restricted to a movement in the direction of one or the other of the cross hairs.

For the purpose of producing movement of the reticule holder 22, in a vertical direction, the holder is bored and threaded at 38, for the reception of the threaded stem 39, of screw 40, the screw 40 extending upwardly through opening 41, in tube 21. Screw 40 is provided with a radial flange 42, forming a shoulder which bears against a flat horizontal face 43, formed near the bottom of elevation screw housing 44. Housing 44 is shown particularly in Figs. 5 and 6, Fig. 5 being an enlarged plan view of the housing while Fig. 6 is a view of the underside of the housing. As shown herein the housing 44 is in the form of a plate shaped at its under side to fit the tube 21 and secured thereon by screws 45 and 46. Screw 45 is mounted in an opening 47, at the rear end of plate 44, and extends downwardly through tube 21 and is threaded in tube 37, the opening 47 being counterbored to receive the screw head 48. Screw 46 is mounted in the forward end of the plate 44, in an opening 49, and extends downwardly through the tube 21, and is threaded in the relatively heavy wall 50, of lens holder 51, mounted in tube 21, just ahead of reticule holder 22, the opening 49 being counterbored to receive the head 52 of screw 46. The flat horizontal face 43, on the under side of the housing, is formed by milling out the plate 44 and is of sufficient depth to receive the flange 42, the flange being received between the tube 21 and face 43. Outwardly from flange 42 the screw 40 is of non-circular shape, in this instance being of rectangular cross-sectional shape, the stem 53 extends upwardly through an opening 54, in housing 44, the opening 54 being elongated circumferentially of the tube 21, as is the opening 41, in tube 21.

On the upper outer end of stem 53 is a screw head or hand piece 55, in the form of a disc, knurled on its peripheral edge 56, for ease of operation, and having an axial opening 57, of rectangular cross-sectional shape, which fits and is received on the stem 53. The housing 44 is provided with an upwardly facing relatively wide and shallow slot 58, in which the hand piece 55 is received, the latter being secured on stem 53, of screw 40, by a screw 59, which passes through a washer 60, and is threaded in an axial opening 61, of stem 53. The washer 60 is generally of saucer-like shape with a concave side abutting the upper surface 62, of hand piece 55, which if desired may be counterbored to receive the washer. The screw 59 by contact with washer 60 forces the hand piece 55 downwardly on stem 53 into contact with the flat horizontal face 63, forming the bottom of slot 58, and draws the screw 40 upwardly, until the flange 42 contacts with the face 43, on the under side of the housing. In this manner endwise movement of screw 40 is prevented, it being understood that faces 43 and 63 are parallel, so that the hand piece and screw are free to rotate and move horizontally to the extent of the circumferential elongation of the openings 41 and 54, the horizontal movement being brought about by the action of the windage screw hereinafter described. As the screw is rotated, by means of hand piece 55, the reticule holder 22 moves upwardly or downwardly, in tube 21, on the threaded stem 39, depending on the direction of rotation of the hand piece, the reticule holder 22 being prevented from rotating with the threaded stem 39, by guide 31. The slot 58 is of a depth substantially equal to the thickness of the hand piece 55, the upper surface 62a, of the hand piece is flush with the upper surface of the housing 44, the latter being of less width than the diameter of the hand piece so that the latter extends outwardly from the housing at either side thereof, whereby the knurled edge 56 may be engaged by the hand of the operator, to produce rotation of the hand piece and screw 40.

The mechanism for producing lateral or windage corrections is substantially the same as that used for vertical or elevation corrections, the reticule holder being bored and threaded at 64, for the reception of the threaded stem 65, of windage screw 66, the screw 66 extending horizontally outwardly through opening 67, in tube 21, the axis of screw 66 being at right angles to that of screw 40, the axes of both screws being radial with respect to the axis of reticule holder 22, and thus radial with respect to the axis of the tube 21, when the reticule holder 22 is adjusted into position concentric with respect to the tube 21. Windage screw 66, intermediate its ends is provided with a radial flange 68, forming a shoulder which bears against a flat vertical face 69, formed near the inner side of windage screw housing 70. Housing 70 is, in this instance, substantially identical with respect to housing 44, and is shaped to fit against and secured on the tube 21, in the same manner as housing 44. Outwardly from flange 68, the screw 66 is provided with a stem 71, which extends outwardly through an opening 72, in housing 70, openings 67 and 72 being elongated circumferentially of tube 21. The stem 71 is of rectangular cross-sectional shape and receives on its outer end a hand piece 73, the latter being similar to hand piece 55, and having an axial opening shaped to fit the stem 71, so that the screw 66 may be rotated thereby. The housing 70 is provided with an outwardly facing relatively wide and shallow slot 74, in which the hand piece 73 is received, the latter being secured on stem 71, by a screw 75, which passes through a washer 76, and is threaded into stem 71. The washer 76 is similar to washer 60 and bears against the outer surface 77, of hand piece 73, to force the latter downwardly on stem 71, into contact with the face 78, at the bottom of slot 74, and to draw the flange 68 against the housing face 69.

Endwise movement of screw 66 is prevented by the contact of flange 68 and hand piece 73 with the vertical parallel faces 69 and 78, on the opposite sides of housing 70. As the screw is rotated, by means of hand piece 73, the reticule holder moves towards one or the other side of the tube 21, depending on the direction of rotation of the screw, the latter being threaded into or out of the holder, through the action of the threaded stem 65, in the threaded bore 64, of holder 22. Rotation of the holder 22, with the stem 65, is prevented by the guide 31. As the holder 22 is moved transversely of the tube 21, by the windage screw 66, the elevation screw 40 moves transversely in the elongated openings 41 and 54, the flange 42 and the hand piece 55, sliding on the faces 43 and 63, of housing 44. The openings 41 and 54, especially the opening 41, prevent movement of the holder 22, and screw 40, longitudinally of tube 21, through engagement of the screw 40, with the circumferential edges of the openings, in which respect they are assisted by hand piece 55, the peripheral edge 56 of the latter being carried between the side edges of the slot 58. Endwise or longitudinal movement of holder 22, with respect to tube 21, is also prevented by the co-operation of screw 66, and openings 67 and 72, and the hand piece 73, carried between the side edges of slot 74. During the vertical adjustment of the holder 22, the screw 66 moves vertically in the openings 67 and 72, the flange 68 and hand piece 73 sliding on the vertical faces 69 and 78 respectively, of housing 70.

From the above description it will be readily understood that vertical adjustments, of the reticule holder 22, and thus the reticule, are brought about by rotation of the hand piece 55, and thus the screw 40, in the proper direction, horizontal movements being brought about by rotation of hand piece 73. In either case the holder acts as a nut, being held against rotation by guide 31, the holder 22 moving along the rotated screw, and carrying the other screw with it.

Preferably the hand pieces 55 and 73 are graduated on their outer faces, the hand piece 73 being graduated at 79 (Fig. 1), the hand piece 55 being graduated in a similar manner. Pointers or indicators 80 and 81, on the forward ends of housings 44 and 70, form convenient reference points for checking the positions of the hand pieces and for carrying out predetermined changes in sight setting. In the form shown the pointers 80 and 81 are secured on housings 44 and 70 by screws 82 and 83, screw 83 being threaded in the head of screw 46, indicator 81 being secured on housing 70, by screw 82, in a similar manner. The outer ends of the indicators are bent inwardly towards tube 21, as shown at 84 and 85, and, by contact with the forward ends of the housings, prevent rotation of the pointers or indicators about screws 82 and 83.

For convenience in adjusting the reticule, and to assist in holding the elevation and windage screws against rotation, the hand pieces 55 and 73 are counterbored, on their inner faces, to receive a part of a click mechanism which will now be described. This mechanism is shown particularly in connection with the elevation screw, but it will be understood that a similar mechanism is provided for the windage screw as well. Received in the counterbore 86, in the lower face of hand piece 55, is a relatively thin disc 87, preferably made out of hardened steel, and having an axially located rectangular opening 88, shaped to fit and received on the stem 53, the screw 40, hand piece 55, and disc 87 rotating together. The lower face 89, of disc 87, is flush with the bottom of the hand piece 55, and provided with a number of radial grooves 90, which, as the hand piece, and thereby the disc, are rotated, are entered by an indentation or rib 91, on click spring 92.

Click spring 92 is of ring-like shape and is received in an annular groove 93, sunk into housing 44, through face 63, the housing being slotted vertically at 94 and 95, to receive the radially inwardly directed tongues 96 and 97, of click spring 92; the tongues holding the spring against rotation. Preferably the spring 92 is arched, as shown in Fig. 11, the spring being flattened in groove 93, by the pressure of disc 87, the resiliency of the spring holding the rib 91 in contact with the disc 87.

The grooves 90 may correspond in number to the graduations on the hand pieces, the rib entering a corresponding groove as a line of the graduations comes opposite the pointer. In the present instance there are twice as many grooves as lines or graduations, the rib entering certain of the grooves as the graduations come opposite the pointer, and entering other grooves when the pointer is midway between the graduations. As the rib enters the grooves an audible clicking sound is heard, the movement of the rib into the grooves being also felt by the fingers of the operator, through the hand piece. Considerably more pressure is required to move the rib out of a groove, than is required to rotate the hand piece when the rib is in contact with the disc between the grooves. For this reason it is possible to move the hand piece a groove, or half graduation at a time, the graduations bearing such a relation to the pitch of the screws that predetermined corrections of sight setting may be readily made.

In order to lock the hand pieces, after adjustment thereof, the hand pieces are grooved on their peripheral edges, as at 98 and 99, washers 100 and 101 being provided, which enter the grooves and, through downward movement of screws 102 and 103, which pass through the washers, serve to force the hand pieces downwardly into tight contact with the housings. The screws 102 and 103 pass downwardly through the housings and tube 21 and are threaded in lens tube 37, the housings being counterbored to receive the washers.

It will be readily understood that during the vertical adjustment, of the reticule holder 22, by screw 40, the arms 27 and 28, of the holder 22, carry the guide 31 with the holder, the guide sliding in the groove 36, of the lens tube 37. During the horizontal adjustment of the holder 22 the latter slides on guide 31, the arms 27 and 28 moving along faces 29 and 30. In order to prevent backlash, or other looseness or play, the guide 31 fits into grooves 26 and 36 relatively tightly, while the threaded stems 39 and 65 are likewise received in a tight fit within their respective threaded openings in holder 22.

While I have shown and described a preferred embodiment of my invention, it is to be understood that the same is not to be limited to all the details shown but is capable of modification and variation within the spirit of the invention and the scope of the appended claims.

What I claim is:

1. In a telescope sight, a casing, a reticule holder in the casing, a vertical screw mounted on the casing and threaded in the holder, a horizontal screw mounted on the casing and threaded in the holder, a guide mounted for vertical movement only in the casing and said holder being mounted for horizontal movement only on the guide.

2. In a telescope sight, a casing, a reticule holder in the casing, an adjusting screw threaded in said holder and extending outwardly through the casing, a housing mounted on the casing, said housing having outer and inner parallel faces in planes perpendicular to the screw axis, and an opening through which a part of the screw extends, a hand piece slidably but non-rotatably mounted on the outer end of the screw and bearing against one of the faces, a flange on the screw bearing against the other face, and spring means mounted on the screw for drawing the hand piece against the first of the faces and the flange against the second of the faces.

3. In a telescope sight, a casing, a reticule holder in the casing, means for adjusting the holder in a vertical direction, and means for adjusting the holder in a horizontal direction, one of said means comprising a housing mounted on the casing, an adjusting screw threaded in the holder and extending outwardly through openings in the casing and housing, said openings being of greater length circumferentially of the casing than the screw diameter, and a disc-like head on the screw, said housing having a flat face on which the head may slide on adjustment of the other adjusting means.

4. In a telescope sight, a casing, a reticule holder within the casing, a vertical adjusting screw threaded in the holder and extending outwardly through the casing, a housing mounted on the casing, said housing having upper and lower horizontal faces and an opening through which a part of the screw extends, a horizontal adjusting screw threaded in the holder and extending outwardly through the casing, a second housing mounted on the casing and having inner and outer vertical faces and an opening through which a part of the horizontal screw extends, the openings for said screws in the casing and housing being of greater length circumferentially of the casing than the screw diameters, hand pieces one on the outer ends of each of said screws, each hand piece bearing against the outer faces of the respective housings, and means on the screws bearing against the inner faces of the housings.

5. In a telescope sight, a casing, a reticule holder in the casing, a reticule mounted thereon and fixed to move therewith, means in the casing for supporting the holder for vertical and horizontal movements and means carried by the casing for effecting the vertical and horizontal movements of the holder, said means including a pair of adjusting screws mounted in the casing and threaded in the holder, the axes of the screws being generally radial with respect to the casing and at right angles to each other, and means for mounting said screws on the casing for rotational movement about their respective axes and for movement of each screw in the direction of the other screw axis.

6. In a telescope sight, a casing, a reticule holder, a screw mounted in the casing and threaded in the holder to adjust the position of the latter with respect to the casing, a disc-like head on said screw adapted to rotate the same to effect the movement of the holder, and means for locking the screw against movement upon adjustment thereof, said means including a screw threaded in the casing and a washer on the last named screw, there being a peripheral groove in the disc-like head into which the washer extends.

7. In a telescope sight, a casing, a reticule holder in the casing, said casing having a thickened part spaced from the holder, a guide in the space between the holder and the thickened part, said guide being generally square in outline, the sides of the square forming a pair of oppositely disposed horizontal faces, and a pair of oppositely disposed vertical faces, a pair of spaced arms on the holder engaging one of the pairs of faces to limit the movement of the guide and holder with respect to one another to the direction of the faces engaged by the arms, and a pair of arms on the thickened part engaging the other pair of oppositely disposed faces to limit the movement of the guide with respect to the thickened part to the direction of the faces engaged by the arms on the thickened part, and means independent of the guide and in direct engagement with the holder for moving the latter in vertical and horizontal directions.

8. In a telescope sight, a casing, a reticule holder in the casing, an adjusting screw threaded in said holder and extending outwardly through the casing, a housing mounted on the casing, said housing having inner and outer parallel faces in planes perpendicular to the screw axis and an opening through which a part of the screw extends, a hand piece mounted on the outer end of the screw and bearing against one of the faces, co-operative means on said hand piece and screw for restraining the hand piece and screw against relative rotational movement while permitting relative axial movement, a flange on the screw bearing against the other face, and means for urging the hand piece axially of the screw towards the flange to bring the hand piece and flange into a relatively tight engagement with the housing faces.

9. In a telescope sight, a casing, a reticule holder in the casing, an adjusting screw threaded in said holder and extending outwardly through the casing, a housing mounted on the casing, said housing having inner and outer parallel faces in planes perpendicular to the screw axis, and an opening through which a part of the screw extends, a hand piece mounted on the outer end of the screw and bearing against one of the faces, a flange on a screw bearing against the other face and a saucer-like washer mounted on said screw and bearing against the hand piece to force the latter axially of the screw towards the flange to bring the flange and hand piece into tight engagement with the respective faces.

10. In a telescope sight, a casing, a reticule holder in the casing, an adjusting screw threaded in the holder and extending outwardly through the casing, a housing mounted on the casing and having a radially outwardly facing transverse slot of rectangular cross section, the slot having a flat bottom which is in a plane perpendicular to the screw axis and vertical sides which are parallel to one another and to the screw axis, a disc-like hand piece mounted on the outer end of the screw at the bottom of the slot and fitting between the parallel sides thereof, co-operating means on the hand piece and screw for producing rotational movement of the screw as the hand piece is rotated, and means for producing motion of the holder in a direction at right angles to the screw axis, the hand piece sliding on the bottom of the transverse slot between the vertical slot sides during such motion.

11. In a telescope sight, a casing, a generally hollow cylindrical reticule holder, a reticule secured on said holder for movement therewith, a vertical adjusting screw threaded in the holder and extending outwardly through the casing, a horizontal adjusting screw threaded in the holder and extending outwardly through the casing, and means for mounting each screw for rotation about its axis and for lateral movement in a direction at right angles to the axis, including disc-like heads, one for each screw, there being relatively flat faces formed externally of the housing and at right angles to one another on which the disc-like heads may slide during the movement of the screws at right angles to their axes.

12. In a telescope sight, a casing, a reticule holder in the casing, a vertical screw threaded in the reticule holder, means for mounting said screw on the casing for rotational movement about the screw axis and transverse movement at right angles to the screw axis, a horizontal screw threaded in the holder, means for mounting the horizontal screw on the casing for rotational movement about the screw axis and transverse movement at right angles thereto, and means mounted in the casing and engaging the reticule holder to prevent movement thereof except in the direction of the screw axes.

13. In a telescope sight, a tubular casing, a reticule holding in the casing, a tubular element mounted within the bore of said casing and extending towards said holder, a guide in said casing between the holder and the tubular element, said guide being generally square in outline, the sides of the square forming a pair of oppositely disposed normally horizontal faces and a pair of oppositely disposed normally vertical faces, a pair of spaced arms on the holder having parallel faces engaging one of the pairs of faces of the guide to limit the movement of the guide and holder with respect to one another to the direction of the faces engaged by the arms, and a pair of arms on the tubular element having parallel faces engaging the other pair of oppositely disposed faces on the guide to limit the movement of the guide with respect to the tubular element to the direction of the faces engaged by the arms on the tubular element, and means for effecting movement of the reticule holder in the directions of the faces on the guide.

FREDERICK ALBERT KUHN.